United States Patent
Haas

(10) Patent No.: US 9,874,039 B2
(45) Date of Patent: Jan. 23, 2018

(54) SHEET MATERIAL FASTENER DEVICE

(71) Applicant: Daniel G. Haas, Rockford, IL (US)

(72) Inventor: Daniel G. Haas, Rockford, IL (US)

( * ) Notice: Subject to any disclaimer, the term of this patent is extended or adjusted under 35 U.S.C. 154(b) by 68 days.

(21) Appl. No.: 14/845,851

(22) Filed: Sep. 4, 2015

(65) Prior Publication Data

US 2016/0069369 A1    Mar. 10, 2016

Related U.S. Application Data

(60) Provisional application No. 62/048,234, filed on Sep. 9, 2014.

(51) Int. Cl.
| | |
|---|---|
| F16B 17/00 | (2006.01) |
| E04H 15/64 | (2006.01) |
| F16B 45/00 | (2006.01) |
| F16B 5/06 | (2006.01) |

(52) U.S. Cl.
CPC ............. *E04H 15/64* (2013.01); *F16B 45/00* (2013.01); *F16B 5/0692* (2013.01)

(58) Field of Classification Search
CPC ........ F16B 17/002; F16B 45/00; E04H 15/64; B60R 16/0222; A44B 13/0058; A44B 13/0076; Y10T 24/44034
USPC ......................................................... 114/218
See application file for complete search history.

(56) References Cited

U.S. PATENT DOCUMENTS

| | | | |
|---|---|---|---|
| 1,818,798 A | * | 8/1931 | Freedlander ............ F16H 55/36 474/167 |
| 2,041,498 A | | 5/1936 | Swidersky |
| 2,089,869 A | | 8/1937 | Wratschko |
| 2,093,231 A | | 9/1937 | Broadwell |
| 2,403,057 A | * | 7/1946 | Davis ...................... B63B 21/04 114/230.26 |
| 2,745,163 A | | 5/1956 | Van Buren, Jr. |
| 2,939,195 A | | 6/1960 | Carlson |
| 3,162,920 A | | 12/1964 | Durham |
| 3,486,788 A | | 12/1969 | Benton |
| 3,686,711 A | | 8/1972 | Kuramoto et al. |
| 3,936,912 A | | 2/1976 | Flanagan |
| 4,023,250 A | * | 5/1977 | Sproul ................. B21D 53/261 29/892.3 |
| 4,522,612 A | * | 6/1985 | Frazer ....................... F16D 1/06 474/168 |
| 4,688,304 A | | 8/1987 | Marcott |
| 4,913,687 A | * | 4/1990 | Soots ....................... F16H 55/38 474/167 |
| 5,046,222 A | | 9/1991 | Byers et al. |
| 5,074,014 A | | 12/1991 | Freeman |

(Continued)

*Primary Examiner* — Robert Sandy
*Assistant Examiner* — Michael S Lee
(74) *Attorney, Agent, or Firm* — Stephen T. Scherrer; Monique A. Morneault; Scherrer Patent & Trademark Law, P.C.

(57) ABSTRACT

A fastener device and method for securing and releasing sheet material. Specifically, the present disclosure relates to a fastener device useful for securing a sheet material to an object, item or the ground, without the need for perforations, holes, eyelets or grommets in the material. The fastener device is easily attached to and removed from sheet material without damaging the material. Additionally, the fastener device is adapted for receiving a coupling or anchoring member for further securing the sheet material to another object or even the ground creating a protective cover or temporary shelter.

12 Claims, 2 Drawing Sheets

(56) References Cited

U.S. PATENT DOCUMENTS

| | | | |
|---|---|---|---|
| 5,168,605 A | 12/1992 | Bartlett | |
| 5,557,830 A | 9/1996 | Davis | |
| 6,199,247 B1 | 3/2001 | Tsai | |
| 6,202,261 B1 * | 3/2001 | Moore | B60R 7/005 24/115 R |
| 6,243,925 B1 | 6/2001 | Aszody | |
| 6,295,703 B1 | 10/2001 | Adams et al. | |
| 6,760,956 B1 | 7/2004 | Lee et al. | |
| 6,978,522 B2 | 12/2005 | Liao | |
| 7,797,799 B2 | 9/2010 | Lawall | |
| 8,621,726 B2 | 1/2014 | Sublette | |
| 2006/0054069 A1 * | 3/2006 | Von Tersch | B63B 21/14 114/218 |

* cited by examiner

SHEET MATERIAL FASTENER DEVICE

This application claims priority to U.S. Provisional Application Ser. No. 62/048,234filed on Sep. 9, 2014, which is incorporated herein in its entirety.

TECHNICAL FIELD

The present disclosure relates to a fastener device. Specifically, the present disclosure relates to a one-piece fastener device for quickly and easily securing flexible, sheet-like materials, including but not limited to, plastic sheets and tarpaulins for use as covers, including waterproof protective covers. Additionally, the present disclosure relates to a one-piece fastener device useful for securing flexible materials for use as a tent structure, or other temporary shelter. The present fastener device is designed to extend the life of flexible sheet materials, because it offers a securing system without damaging the material.

BACKGROUND

It is, of course, generally known to cover items using flexible sheet materials, such as a tarpaulin or tarp for storage and protection. Sheet materials can include any suitable material, including fabrics, plastic films, canvas, screens, netting, webbing and the like. Similarly, it is known to use some form of fastener for securing and supporting the sheet materials in place. Fasteners are also desirable for holding a tent or other form of temporary shelter in place.

Difficulty arises in securing the flexible material in position, particularly against the elements. Additionally, know means of securing flexible materials in position include penetrating fasteners, such as pins, tacks and nails, which also generally incorporate metal eyelets placed within the fabric. However, while all of these known fastening devices may be effective for holding the sheeting material in place, the result is holes, tearing and other damage to the material making it potentially unusable after only a few applications.

Previous covers typically incorporated metal eyelets or grommets evenly spaced along the edge of the cover. The eyelets or grommets were designed to receive a securing device, including but not limited to, cords, ropes, wire, cable and the like for securing the cover into the desired position. The metal grommets or eyelets are pierced into the cover, becoming a permanent feature such that removal of the grommet would tend to damage the plastic cover. Additionally, because the grommets are fixed features on the sheet, options for positioning the sheets or alternative tying arrangements are limited.

Continuous use of an eyelet or grommet, however, can eventually result in strain and tearing of the surrounding cover fabric or material, or even loss of a grommet. Tearing the fabric or even losing the metal grommet decreases the options for using the cover, as well as, shortens the life of the cover. Further, damaged covers may result in exposure of the items to the elements, resulting in damage to the items the cover was originally installed to protect. Damage of tent or shelter fabric due to a worn eyelet or missing grommet can also result in loss of an expensive tent, and unwanted exposure to the weather. However, repairing or replacing damaged or lost grommets may require special equipment not readily available.

Therefore, a need exists for a fastener device for easily and securing sheet material, such as fabric, films, plastic tarps, and the like. Specifically, a need exists for a fastener device and method for securely holding sheet material in position without damaging the material.

A need further exists for a fastener device which may be readily and quickly secured to any section of the sheeting materials without the necessity of providing holes in the sheeting.

Moreover, a need exists for a fastener device that can be positioned and re-positioned on any section or on any area of the sheeting material with ease and simplicity providing a fastening structure that is secure in installation and re-usable any number of times with any type of flexible film, sheet or textile material.

A need further exists for a fastener device which is easily removed from the sheeting material without damaging the surrounding sheet material, thereby preserving the material for repeated use.

A need also exists for a fastener that is versatile enough to securely receive attachment members, including ropes, cables, wires, hooks, screws, nails, conventional tent stakes and poles, and a variety of other attachment or anchoring members used to secure the sheeting material to another structure, item or to the ground.

SUMMARY

The present disclosure relates to a device and method for securing and releasing a sheet of flexible material to another object. More specifically, a fastener device and method is provided for quickly and easily securing and releasing a sheet of flexible material to another object or even to the ground creating a protective cover or temporary shelter or tent, without damaging the material.

To this end, in an embodiment of the present invention, a fastener device is provided. The fastener device comprises a one-piece cylindrical body having an upper section and a lower section, wherein the upper section includes two peripheral annular side walls with a radius groove formed between the side walls, and, a central bore passing through a length of the body.

In another embodiment of the present invention, a fastener is provided. The fastener comprises a one-piece cylindrical body of a predetermined length, the body having an upper section having two peripheral annular side walls having a diameter D1 with a radius groove formed between the side walls, a middle section having a shoulder, and a lower section having an elongated shank portion, the lower section further including an aperture.

It is, therefore, an advantage and objective of the present disclosure to provide a fastener device for securely holding sheet material in position without damaging the material.

It is yet another advantage and objective of the present disclosure to provide a fastener device for releasing a sheet material from a secured position without damaging the material.

It is further an advantage and objective of the present disclosure to provide a fastener device that provides a variety of options for securely holding sheet material in position without damaging the material.

It is yet another advantage and objective of the present disclosure to provide a fastener device that does not require corresponding grommets or eyelets in the body of the flexible sheet material for engagement with the sheet material.

It is further an advantage and objective of the present disclosure to provide a fastener device that can be easily secured to and released from a flexible sheet material without requiring special tools.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present invention relates to a fastener device and method for securing and releasing sheet material. Specifically, the present disclosure relates to a fastener device useful for securing a sheet material to an object, item or the ground, without the need for perforations, holes, eyelets or grommets in the material body. The fastener device is easily attached to and removed from the sheet material without damage to the material. Additionally, the fastener device is adapted for receiving a coupling or anchoring member for securing the sheet material to another object or even the ground creating a protective cover or temporary shelter.

Now referring to the figures, wherein like numerals refer to like parts, FIGS. 1-5 illustrate an embodiment of the fastener device 10 of the present disclosure. FIGS. 6-10 illustrate the present fastener device in use and securing a sheet material.

It is commonly known to use some form of securing or fastening device for holding and anchoring flexible sheet-like materials, such as plastic tarps, or when setting up generally temporary structures, such as tents or shelters. Flexible sheet materials can include, but are not limited to fabrics, films of plastic, tarps and tarpaulins, canvas, screens, netting, webbing, and the like. The present fastener device 10 provides a convenient, efficient device for constructing a portable, self-supporting structure or cover.

Figure 6:
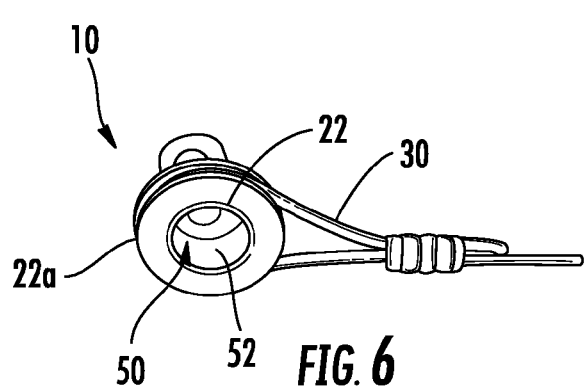
FIG. 6 illustrates a top view of the fastener device of the present disclosure with a coupling device.
Figure 7:
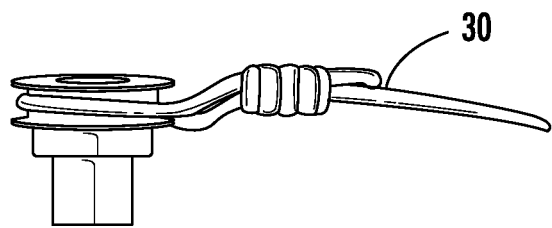
FIG. 7 illustrates a side view of the fastener device in FIG. 6.

As shown in FIGS. 1-5, the present fastener device 10 includes a one-piece cylindrical body 12 having an overall tapered appearance. The body 12 includes an upper section 14 and a lower section 18, having varying diameters. The upper section 14 further is formed by two annular side walls, a first side wall 22 and a second side wall 24. A radius groove 20 is formed between the first and second side walls. The first side wall 22 further includes a top outer surface 22a of the fastener device 10. As shown in FIGS. 6 and 7, the groove 20 is useful for receiving a coupling or connecting device 30, such as a rope, cord, wire, or other connecting member, which can be used to further secure the flexible material to another object or the ground. The annular side walls, 22, 24 prevent the connecting device from sliding out of the groove 20. The upper section 14 has a diameter D1.

Figure 1:
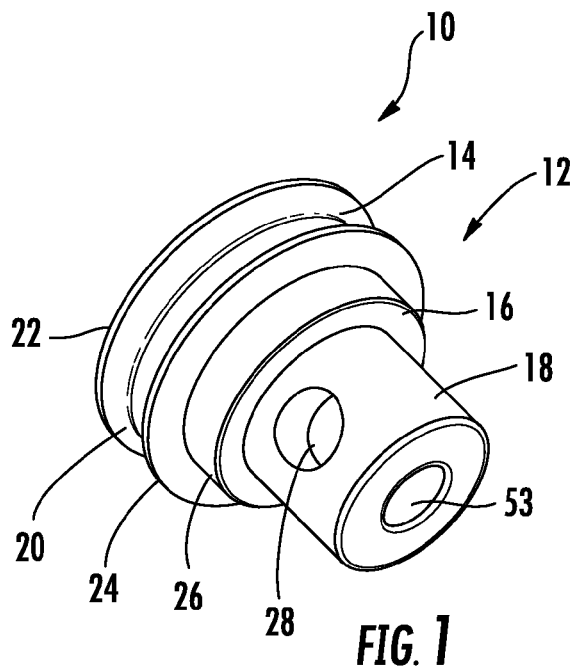
FIG. 1 illustrates a perspective view of the fastener device of the present disclosure.
Figure 2:
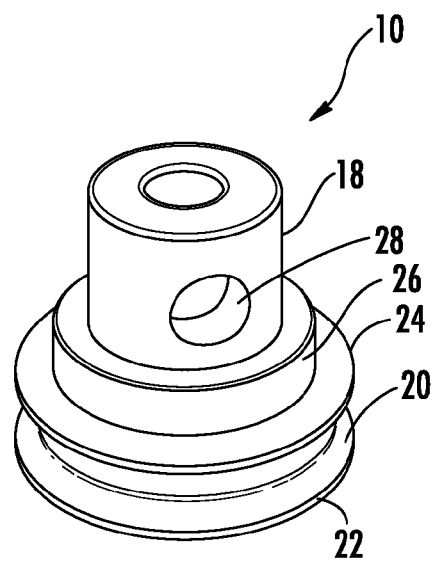
FIG. 2 illustrates a side view of the fastener device of the present disclosure.
Figure 3:
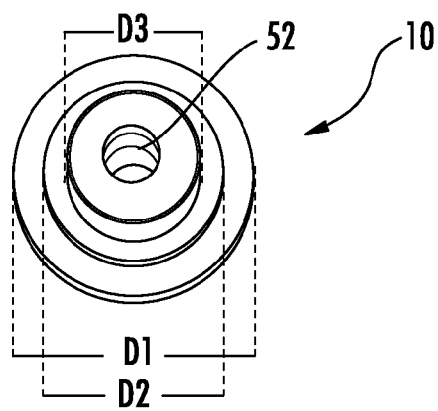
FIG. 3 illustrates a bottom view of the fastener device of the present disclosure.

As shown in FIGS. 1 and 2, the fastener device 10 further includes a middle section 16.

Figure 4:
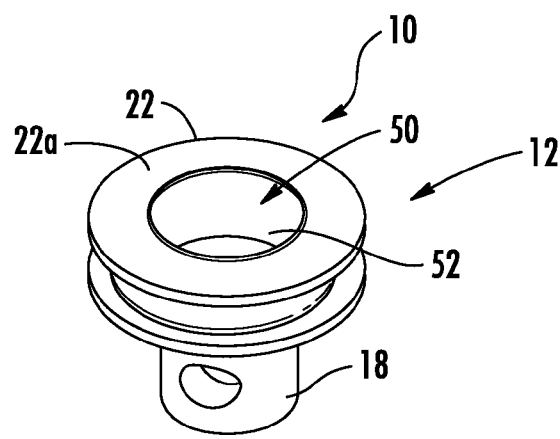
FIG. 4 illustrates a side view of the fastener device of the present disclosure.
Figure 5:
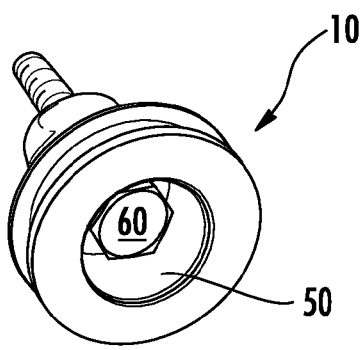
FIG. 5 illustrates a top view of the fastener device of the present disclosure.

The middle section 16 may be formed as a shoulder 26 below the second annular side wall 24 of the upper section 14. The shoulder 26 has a diameter D2, which is smaller than the diameter (D1) of the upper section 14 of the device 10 (FIG. 4). The middle section 16 provides an area of reinforcement between the upper section 14 and the lower section 18, but may also provide another area for wrapping and securing a connecting member 30. Optionally, the shoulder 26 may include a groove similar to the groove 20 in the upper section 14, to enhance receiving and retaining a connecting device on the shoulder 26.

The device 10 further includes a lower section 18 having a column structure, such that the lower section generally has an overall length greater than the upper section 14 and middle section 16. The lower section 18 includes an overall diameter (D3), which is smaller than the diameters (D1 and D2) of both the middle section 16 and the upper section 14 (FIG. 4). The lower section 18 includes an aperture 28 which passes through a transverse plane of the lower section 18.

As shown in in FIGS. 1-4, the body 12 of the fastener device 14 has a central bore 50. The central bore 50 passes through the body 12 from the top surface 22a of the upper section 14 to an end 22b of the lower section 18. The central bore 50 is designed, in part, to receive a securing or attachment device, such as a nail, screw, bolt and the like, so that the fastener device 10 can be secured to another object. Although a bolt 60 is shown, it should be understood that the securing device can be any form of suitable securing or attachment device. In this manner, when the fastener device 10 can be used to provide a more permanent or semi-permanent fixture, such as an anchor or stake.

Further, because the opening 52 at the top of the central bore 50 in the top surface 22a of the device has a diameter larger than the bottom opening 53 of the bore, the securing or attachment device may be recessed within the top surface of the device. Specifically, the opening 52 is a countersunk hole which allows the head of an attachment device, such as a screw head or bolt head, to be recessed within the opening. Recessing the head of the appropriate attachment device within the opening 52 provides for a more secure attachment of the fastening device 10 to the selected object because there is less of a chance the screw, bolt or nail can be damaged or easily pulled out. Optionally, the opening 52 may also be used to receive a post or leg-type of support. Further, the opening 52 may receive the lower section 18 of other fastener devices, such that numerous devices can be stacked together for convenient storage and transport.

Figure 8:
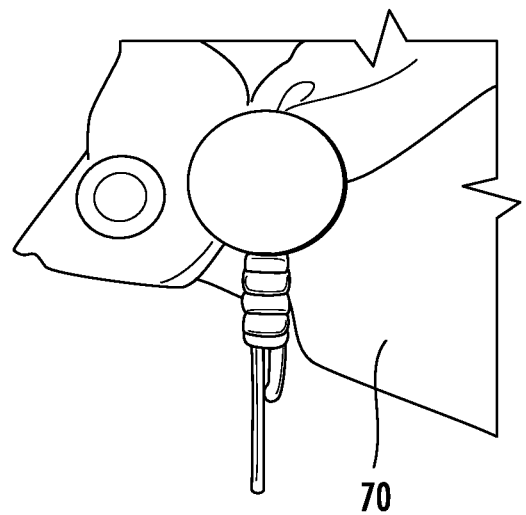
FIG. 8 illustrates the fastener device of the present disclosure in use with a sheet material in the form of a tarp.

As shown in FIGS. 6-9, the present fastening device 10 provides numerous coupling options for easily and quickly securing to a flexible sheet-like material, such as a tarp. For example, FIGS. 6 and 7 illustrate that the groove 20 in the upper section 14 is adapted to receive and secure a coupling or connecting device, including but not limited to, a rope 30, cord or wire. As illustrated in FIG. 8, a tarp 70 is folded or placed over the top of the fastener device 10. A coupling device such as a rope 30 wraps around the material, pressing into the groove 20 in the upper portion 14, and securing the material around the fastener device. The rope 30 may then be further attached to another object or even the ground, fixing the flexible material as a cover or temporary shelter.

Figure 9:
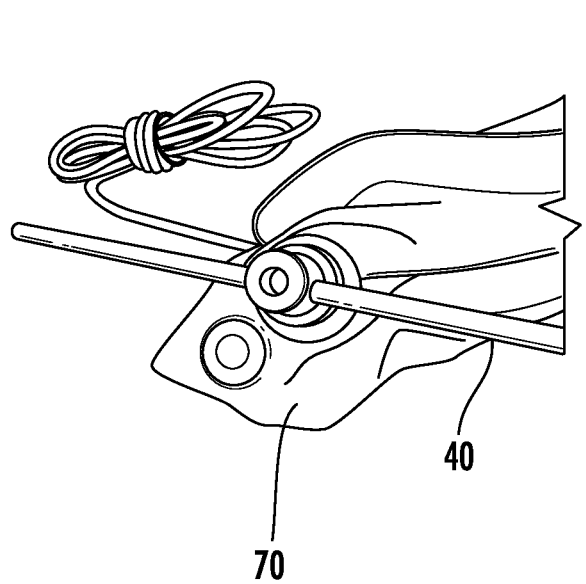
FIG. 9 illustrates the fastener device of the present disclosure including an anchoring member; and, FIG. 10 illustrates the fastener device of the present disclosure including a coupling device.
Figure 10:
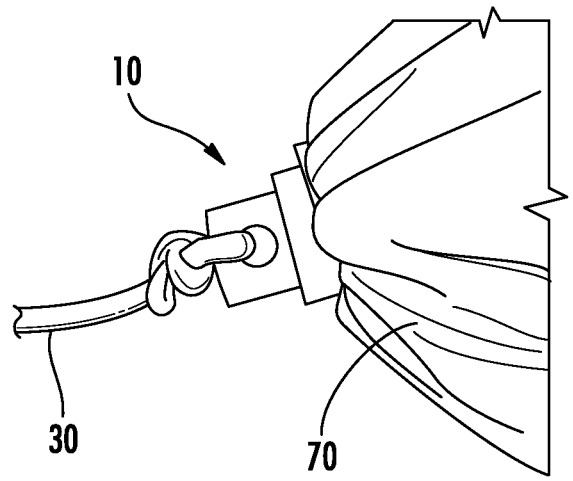

As shown in FIGS. 9 and 10, the aperture 28 in the lower section 18 of the fastener device 10 is adapted for receiving an anchoring member 40 (FIG. 9), or it can be used for receiving a rope 30, cord or wire (FIG. 10). Use of an anchoring member 40, such as a tent stake or pole, permits the fastener device 10 to be secured directly to the ground. Optionally, use of a connector or coupling device 30, such as a rope, cable, wire, etc., through the aperture is further useful for suspending the sheet material from an overhead structure, such as roof or tree branch.

An advantage of the present fastener device 10 is that it can be used to secure a flexible sheet material quickly and easily without damaging the material. Additionally, the present device can be used without the need to incorporate grommets or eyelets into the body of the material, which can be ripped out causing damage to the material. Thus, use of the present fastener 10 prolongs the life of sheet materials, including tents and tarps, while providing a variety of options for use as a secure fastening and releasing system. The present fastener device 10 also provides a variety of options for securing flexible sheet material to the device, as well as, numerous options for securing the fastener to other objects, including the ground.

As shown in FIG. 8, initial use of the present fastener 10 involves placing the material 70 over the upper section 14 of the fastener, and securing the material by looping a rope 30 around the material and the fastener. The rope 30 secures the material snug within the groove 20 in the upper section of the fastener. In this manner, the present fastener 10 provides a convenient option for creating a protective cover or temporary shelter without the need for special tools. Another advantage offered by the present fastener device 10 is that because it does not require grommets or eyelets positioned within the material, the fastener device can be placed anywhere on the material. This feature gives the option to position the material in any suitable cover size and shape.

As further illustrated in FIG. 9, once the material 70 is secured to the fastener 10, an anchoring device 40, such as a stake, tent pole, rod, even branches or sticks, can be passed through the aperture 28 in the lower section. In this manner, the sheet material 70 can be secured to the ground, creating a temporary shelter, such as a tent or cover. Another option would be to initially secure the fastener device 10 to another object, using a bolt, nut, screw, nail or any other attachment device positioned through the central bore 50, as previously described, and shown in FIG. 5. Anchoring the fastener device 10 in this manner creates a relatively permanent structure.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A fastener device comprising:
    a one-piece cylindrical body having an upper section, a middle section and a lower section, the upper section comprising two peripheral annular side walls with a radius groove formed between the side walls, wherein the upper section has an outer diameter greater than an outer diameter of the middle section and the middle section has an outer diameter greater than an outer diameter of the lower section;
    a central bore passing through a length of the body; and,
    an aperture passing in a transverse plane through the lower section.

2. The fastener device of claim 1, wherein the groove is adapted to receive and hold a coupling member.

3. The fastener device of claim 1, wherein the middle section forms a shoulder.

4. The fastener device of claim 3, wherein the shoulder has an outer diameter greater than an outer diameter of the lower section.

5. The fastener device of claim 1, wherein the lower section is a column having an overall length greater than either the upper section or the middle section.

6. The fastener device of claim 1, wherein the aperture is adapted for receiving a coupling device.

7. The fastener device of claim 1, wherein the aperture is adapted for receiving an anchoring member.

8. The fastener device of claim 1, wherein an inner diameter of the central bore tapers from a top surface of the device to a bottom surface of the device.

9. The fastener device of claim 8, wherein the central bore includes a countersunk opening for receiving a fastener, wherein the fastener is positioned below the countersunk opening.

10. The fastener device of claim 8, wherein the cylindrical body further includes a central bore intersecting with the aperture of the lower section.

11. The fastener device of claim 1, wherein the device is adapted for securing a flexible material.

12. A fastener comprising:
    a one-piece cylindrical body of a predetermined length, the body comprising:
        an upper section having two peripheral annular side walls having a diameter D1 with a radius groove formed between the side walls,
        a shoulder having a groove formed therein,
        a lower section forming a column, the lower section further including an aperture passing through a transverse plane of the lower section,
        wherein the upper section has a predetermined diameter greater than a predetermined diameter of the shoulder, and wherein the shoulder has a predetermined diameter greater than the predetermined diameter of the lower section.

* * * * *